US011623294B2

(12) United States Patent
Matthews et al.

(10) Patent No.: US 11,623,294 B2
(45) Date of Patent: Apr. 11, 2023

(54) METHODS AND SYSTEMS USING A SMART TORCH WITH POSITIONAL TRACKING IN ROBOTIC WELDING (71) Applicant: Lincoln Global, Inc., Santa Fe Springs, CA (US)

(72) Inventors: William Thomas Matthews, Chesterland, OH (US); Lance F. Guymon, Fort Collins, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1069 days.

(21) Appl. No.: 16/190,620

(22) Filed: Nov. 14, 2018

(65) Prior Publication Data
US 2019/0160583 A1 May 30, 2019

Related U.S. Application Data (60) Provisional application No. 62/592,072, filed on Nov. 29, 2017.

(51) Int. Cl.
*B23K 9/12* (2006.01)
*B23K 9/095* (2006.01)
(Continued)

(52) U.S. Cl.
CPC .............. *B23K 9/126* (2013.01); *B23K 9/091* (2013.01); *B23K 9/095* (2013.01); *B23K 9/0953* (2013.01); *B23K 9/0956* (2013.01); *B23K 9/1062* (2013.01); *B23K 9/1087* (2013.01); *B23K 9/127* (2013.01); *B23K 9/1276* (2013.01); *B23K 9/133* (2013.01); *B23K 31/003* (2013.01);
(Continued)

(58) Field of Classification Search
CPC ................... B23K 9/126–1276; B23K 31/006
See application file for complete search history.

(56) References Cited

U.S. PATENT DOCUMENTS 3,610,868 A * 10/1971 Mantel ................... B23K 9/186
219/73
4,011,437 A * 3/1977 Hohn ................. G05B 19/4083
318/568.23
(Continued)

FOREIGN PATENT DOCUMENTS

CN 101623867 A * 1/2010 ......... B23K 26/0884
JP S 58 168475 A 3/1982
(Continued)

OTHER PUBLICATIONS

Extended European Search Report from Corresponding Application No. EP20171722.0; dated Oct. 13, 2020; pp. 1-8.
(Continued)

*Primary Examiner* — John J Norton
(74) *Attorney, Agent, or Firm* — Calfee, Halter & Griswold LLP; David J. Muzilla (57) ABSTRACT

A system and method of electric arc welding that includes a welding apparatus having an electric arc welder torch with sensors to determine the absolute position of the torch tip and the relative position of the torch tip to the weld joint during automatic welding. Combining absolute and relative positional data can be used to adjust the path of the robot during automated or robotic welding in response to variations in the weld joint.

8 Claims, 6 Drawing Sheets

(51) Int. Cl.
  *B23K 9/127* (2006.01)
  *B23K 9/10* (2006.01)
  *G05B 19/418* (2006.01)
  *B23K 31/00* (2006.01)
  *B23K 31/12* (2006.01)
  *B23K 37/00* (2006.01)
  *B25J 11/00* (2006.01)
  *B23K 9/09* (2006.01)
  *B25J 9/16* (2006.01)
  *B23K 9/133* (2006.01)
  *B23K 10/02* (2006.01)
  *B23K 26/342* (2014.01)
  *B23K 15/00* (2006.01)
  *B23K 9/04* (2006.01)

(52) U.S. Cl.
  CPC ............ *B23K 31/125* (2013.01); *B23K 37/00* (2013.01); *B25J 9/163* (2013.01); *B25J 9/1661* (2013.01); *B25J 9/1664* (2013.01); *B25J 11/005* (2013.01); *G05B 19/41875* (2013.01); *B23K 9/04* (2013.01); *B23K 10/027* (2013.01); *B23K 15/0086* (2013.01); *B23K 26/342* (2015.10); *G05B 2219/31087* (2013.01); *G05B 2219/32194* (2013.01); *G05B 2219/32234* (2013.01); *G05B 2219/32397* (2013.01); *G05B 2219/45104* (2013.01)

(56) References Cited

U.S. PATENT DOCUMENTS

| | | | | |
|---|---|---|---|---|
| 4,448,342 A * | 5/1984 | Abe | .................. | B23K 9/127 901/29 |
| 4,613,943 A * | 9/1986 | Miyake | .................. | B23K 9/12 901/3 |
| 4,642,447 A * | 2/1987 | Detriche | .............. | G05B 19/425 901/42 |
| 4,642,752 A | 2/1987 | Debarbieri et al. | | |
| 4,675,502 A * | 6/1987 | Haefner | ................. | B25J 9/1684 901/3 |
| 4,706,204 A * | 11/1987 | Hattori | ................... | G05B 19/42 901/17 |
| 4,877,941 A * | 10/1989 | Honma | ................. | B23K 9/1075 219/130.21 |
| 5,006,999 A * | 4/1991 | Kuno | ................... | G05B 19/425 219/124.34 |
| 5,260,629 A * | 11/1993 | Ioi | .......................... | B25J 9/1615 318/567 |
| 5,550,953 A * | 8/1996 | Seraji | ....................... | B25J 9/162 700/263 |
| 5,834,916 A * | 11/1998 | Shimogama | ....... | G05B 19/4061 318/568.13 |
| 6,429,404 B1 | 8/2002 | Suzuki | | |
| 6,430,472 B1 * | 8/2002 | Boillot | ................. | G05B 19/056 901/41 |
| 6,583,386 B1 | 6/2003 | Ivkovich | | |
| 7,166,815 B2 * | 1/2007 | Broehl | ..................... | B23K 9/20 219/98 |
| 7,181,314 B2 * | 2/2007 | Zhang | .................... | B25J 9/1687 414/754 |
| 8,710,404 B2 | 4/2014 | Ma et al. | | |
| 8,793,069 B2 * | 7/2014 | Kuroda | ................... | G01S 17/66 701/519 |
| 9,302,397 B2 | 4/2016 | Kimoto | | |
| 2003/0046382 A1 | 3/2003 | Nick | | |
| 2008/0009972 A1 * | 1/2008 | Nihei | ..................... | B25J 9/1669 700/245 |
| 2008/0083716 A1 | 4/2008 | Shigeyoshi | | |
| 2012/0234812 A1 | 9/2012 | Ma et al. | | |
| 2012/0305532 A1 * | 12/2012 | Harris | .................. | B23K 9/1735 219/76.14 |
| 2014/0042136 A1 | 2/2014 | Daniel et al. | | |
| 2016/0214198 A1 * | 7/2016 | Hsu | ........................ | G01C 25/00 |
| 2016/0361774 A9 | 12/2016 | Daniel et al. | | |
| 2016/0361776 A1 * | 12/2016 | Zhang | .................. | G01C 25/005 |
| 2017/0239892 A1 * | 8/2017 | Buller | .................. | B23K 26/702 |
| 2018/0015571 A1 * | 1/2018 | Wang | ................... | G01B 11/022 |
| 2019/0160583 A1 * | 5/2019 | Matthews | ........ | G05B 19/41875 |

FOREIGN PATENT DOCUMENTS

| | | | |
|---|---|---|---|
| JP | 09076065 A * | 3/1997 | |
| JP | 2007290025 A * | 11/2007 | |
| JP | 5 421172 A | 2/2014 | |
| WO | 90/00108 A1 | 1/1990 | |
| WO | WO-2010003289 A1 * | 1/2010 | ......... B23K 26/0884 |
| WO | 2011/039542 A1 | 4/2011 | |
| WO | 2013/160745 A1 | 10/2013 | |
| WO | 2015/066592 A1 | 5/2015 | |
| WO | 2016/064660 A1 | 4/2016 | |
| WO | 2016/075518 A1 | 5/2016 | |
| WO | 2016/090903 A1 | 6/2016 | |

OTHER PUBLICATIONS

Wang; "Intelligent Predictive Maintenance (IPdM) System—Industry 4.0 Scenario;" WTT Transactions on Engineering Sciences; vol. 113; Dated Feb. 1, 2016; pp. 1-10.
Extended European Search Report from Corresponding Application No. EP20171703.0; dated Aug. 20, 2020; pp. 1-8.
Extended European Search Report from Corresponding Application No. 18208898.9; dated Sep. 17, 2019; pp. 1-7.
Extended European Search Report from Corresponding Application No. 18208880.7; dated Sep. 17, 2019; pp. 1-8.
International Search Report from Corresponding Application No. PCT/IB2018/001359; dated Mar. 29, 2019; pp. 1-13.
Extended European Search Report from Corresponding Application No. 18208892.2; dated Dec. 16, 2019; pp. 1-13.
Partial European Search Report from Corresponding Application No. 18208892.2; dated Jun. 12, 2019; pp. 1-13.

* cited by examiner

METHODS AND SYSTEMS USING A SMART TORCH WITH POSITIONAL TRACKING IN ROBOTIC WELDING

CROSS REFERENCE TO RELATED APPLICATION

This application claims priority to, and any other benefit of, U.S. Provisional Patent Application Ser. No. 62/592,072 filed on Nov. 29, 2017 and entitled METHODS AND SYSTEMS USING THE INTERNET-OF-THINGS IN ROBOTIC WELDING.

BACKGROUND OF THE INVENTION

Embodiments of the present invention generally relate to systems and methods related to welding, and more specifically to networked robotic welding using the Internet-of-Things (IOT). Welding systems are commonly used with robots to accurately and repeatedly weld components together. Such robotic welding systems are generally disposed within a welding cell to safely contain a welding operation and to protect users that may be observing the process. Typically, the robotic welding system includes a robot arm with a welding torch that is used to weld a workpiece positioned on a work table within the welding cell. The robot is programmed to weld along a desired or planned path commensurate with each particular weld type. Today, communications between systems within a welding cell, between two or more welding cells, or between a welding cell and external systems is limited, for example, in capability and speed. Such limited communication limits control, speed, accuracy, and other aspects of welding processes and operations. Improved systems and methods are needed to overcome these and other deficiencies.

In view of the foregoing problems and shortcomings of existing welding apparatus, the present application describes a system and method to overcome these shortcomings.

SUMMARY

Embodiments of the present invention include systems, architectures, processes, and methods for enhancing various aspects of robotic welding via the internet-of-things (interconnections, via the internet, of computer devices embedded in objects, allowing data to be communicated between the objects).

According to one aspect of the present invention, a method of electric arc welding includes determining a relative position of a welding torch to an actual weld path using a relative position sensor, determining an absolute position of the welding torch using an absolute position sensor, calculating a correction vector based on the relative position of the welding torch to the actual weld path and the absolute position of the welding torch when the actual weld path is different from a planned weld path, and moving the welding torch in accordance with the planned welding path and the correction vector.

The descriptions of the invention do not limit the words used in the claims in any way or the scope of the claims or invention. The words used in the claims have all of their full ordinary meanings

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention. It will be appreciated that illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The following includes definitions of exemplary terms used throughout the disclosure. Both singular and plural forms of all terms fall within each meaning:

"Component," as used herein can be defined as a portion of hardware, a portion of software, or a combination thereof. A portion of hardware can include at least a processor and a portion of memory, wherein the memory includes an instruction to execute.

"Logic," synonymous with "circuit" as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device and/or controller. Logic may also be fully embodied as software.

"Software", as used herein, includes but is not limited to one or more computer readable and/or executable instructions that cause a computer, logic, or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Embodiments of systems, architectures, processes, and methods for robotic welding are disclosed. The examples and figures herein are illustrative only and are not meant to limit the subject invention, which is measured by the scope and spirit of the claims. The showings are for the purpose of illustrating exemplary embodiments of the subject invention only and not for the purpose of limiting same.

Figure 1:
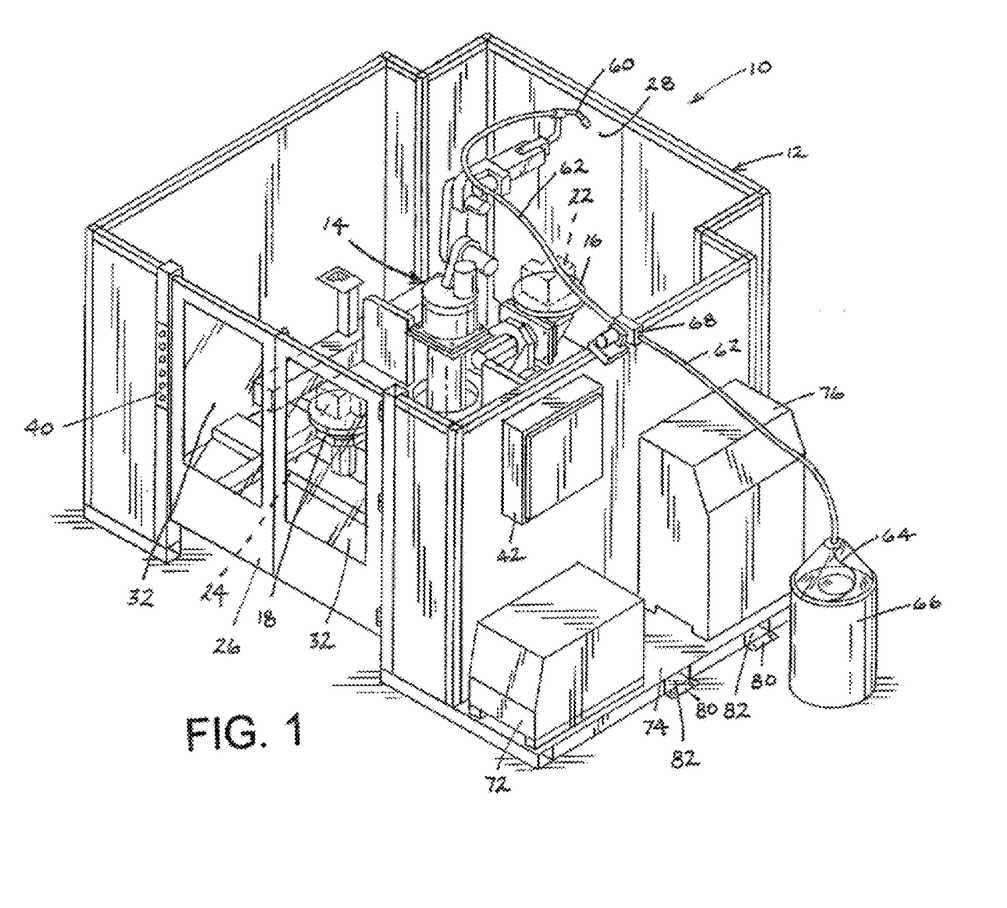
FIG. 1 illustrates an exemplary embodiment of a robotic welding cell unit.

With reference to FIG. 1, a drawing of an exemplary welding cell 10 generally includes a frame 12, a robot 14 disposed within the frame 12, and first and/or second welding tables 16 and 18, respectively, also disposed within the frame 12. The robot welding cell 10 is useful for welding workpieces 22 and/or 24 disposed on the welding tables 16, 18 in a manner that will be described in more detail below.

In the depicted embodiment, the frame 12 includes a plurality of side walls and doors to enclose the robot 14 and the welding tables 16 and 18. Even though a substantially rectangular configuration in plan view is shown, the frame 12, and the cell 10, can take numerous configurations.

A front access door 26 mounts to the frame 12 to provide access to the interior of the frame 12. The front access door 26 can take a bi-fold configuration where the door includes two hinge sets: a first hinge set attaching the door 26 to the frame 12 and a second hinge set attaching one panel of the door to another panel. Nevertheless, the front access door 26 can take other configurations such as a sliding door or a swinging door. Similarly, a rear access door 28 also mounts to the frame 12. The rear access door 28 in the depicted embodiment also takes a bi-fold configuration; however, the rear access door can take other configurations such as those discussed with reference to the front access door 26. Windows 32 can be provided on either door (only depicted on front door 26). The windows can include a tinted safety screen, which is known in the art.

A control panel 40 is provided on the frame 12 adjacent the front door 26. Control knobs and/or switches provided on the control panel 40 communicate with controls housed in a controls enclosure 42 that is also mounted to the frame 12. The controls on the control panel 40 can be used to control operations performed in the cell 10 in a similar manner to controls used with known welding cell units.

In one embodiment, the robot 14 mounts on a pedestal that mounts on a support. In other embodiments, other automated movement devices may be used to control movement of the welding device. The robot 14 in the depicted embodiment is centered with respect to the welding tables 16 and 18 and includes eleven exemplary axes of movement. If desired, the pedestal can rotate with respect to the support similar to a turret. Accordingly, some sort of drive mechanism, e.g. a motor and transmission (not shown), can be housed in the pedestal and/or the support for rotating the robot 14.

In one embodiment, a welding torch or gun 60 of the welding device attaches to a distal end of the robot arm 14. The welding gun 60 can be similar to those that are known in the art and suitable for any type of welding, cutting, or similar processes, including, for example, shielded metal arc welding (SMAW), gas metal arc welding (GMAW, MIG), flux-cored arc welding (FCAW), gas tungsten arc welding (GTAW, TIG). A flexible tube or conduit 62 attaches to the welding gun 60, which can contain power, shielding gas, and/or consumable wire. For example, depending on the type of welding, consumable welding electrode wire 64, which can be stored in a container 66, may be delivered to the welding gun 60 through the conduit 62. A wire feeder 68 can be attached to the frame 12 to facilitate the delivery of welding wire 64 to the welding gun 60. Even though the robot 14 is shown mounted to a base or lower portion of the frame 12, if desired, the robot 14 can mount to an upper structure of the frame and depend downwardly into the cell 10.

In one embodiment, a power source 72 for the welding operation mounts to and rests on a platform 74 that is connected to and can be a part of the frame 12. A robot controller 76, which controls the robot 14, also rests and mounts on the platform 74. The robot controller 76 typically accompanies the robot 14. A cell base can include various attachment points 80 and channels 82. Although shown as a stationary cell within a frame, other embodiments can include a robot and the associated welding equipment as part of a moving assembly line, a portable cell, etc.

In one embodiment, a welding controller may also be included into the cell 10, for example, as a stand-alone device/component or as part of the controls enclosure 42, power source 72, robot controller 76, etc. A system controller may also comprise one or more of the controllers. Any or all of these controllers and control systems may be combined to various degrees into shared systems or enclosures.

Figure 2:
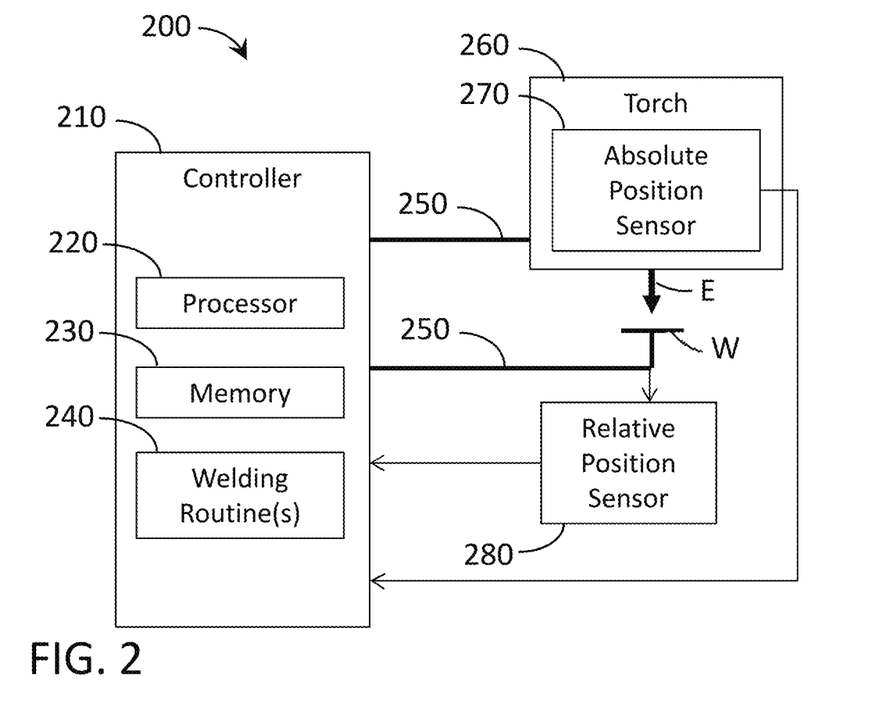
FIG. 2 illustrates a block diagram of an exemplary welding system with absolute and relative position sensors.

With reference to FIG. 2, a block diagram of an exemplary welding system 200 is shown. In this embodiment, a weld controller 210 comprises a processor 220, memory 230, and welding routine(s) 240. The welding system 200 may include various components, logic, and software. By way of example and not limitation, a welding cell (such as, for example, cell 10 from FIG. 1) can include welding equipment (e.g., controller for a welder power source, welding device, wire feeder, welder power source, controller for a robot, among others) that can implement one or more routines or steps related to a particular welding process for a specific workpiece, wherein a routine can include a respective setting, configuration, and/or position (e.g., path) for the welding equipment. Furthermore, the controller 210 can directly or indirectly control one or more welder power sources, parameters, welding schedules, robots, fixtures, feeders, etc. associated with one or more welding routines 210 or processes stored in memory 230. An example of direct control is the setting of various welding parameters (voltage, current, waveform, etc.) associated with the welding power supply. An example of indirect control is the communication of welding position, path, speed, etc. to a robot controller or other peripheral device. The controller 210 may also execute welding sequences as described in US Pub. No. 2014/0042136 (Ser. No. 13/803,032), which is hereby incorporated by reference in its entirety. The hierarchy of the various controllers that may be associated with a welding cell 10 can be arranged in any suitable manner to communicate the appropriate commands to the desired devices.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with welding system 200.

Welding system 200 can utilize an exemplary environment for implementing various aspects of the invention including a computer, wherein the computer includes the processor 220, the memory 230, and a system bus. The system bus couples system components including, but not limited to the memory 230 to the processor 220, and can communicate with other systems, controllers, components, devices, and processors. The processor 220 may be any of various commercially available processors. Dual microprocessors and other multi-processor architectures also can be employed as the processing unit.

The memory 230 can include read only memory (ROM) and random access memory (RAM). A basic input/output system (BIOS), containing the basic routines that help to transfer information between elements within welding system 200, such as during start-up, is stored in the ROM. The memory 230 can store various software, including routines, such as welding routine(s) 240.

Welding system 200 can further include a hard disk drive, a magnetic disk drive, e.g., to read from or write to a removable disk, and an optical disk drive, e.g., for reading a CD-ROM disk or to read from or write to other optical media. Welding system 200 can include at least some form of computer readable media. Computer readable media can be any available media that can be accessed by the computer. By way of example, and not limitation, computer readable media may comprise computer storage media and communication media. Memory and computer storage media includes volatile and nonvolatile, removable and non-removable media implemented in any method or technology for storage of information such as computer readable instructions, data structures, program modules or other data. Memory and computer storage media includes, but is not limited to, RAM, ROM, EEPROM, flash memory or other memory technology, CD-ROM, digital versatile disks (DVD) or other magnetic storage devices, or any other medium which can be used to store the desired information, and which can be accessed by welding system 200.

Welding system 200 provides welding power or waveforms via an output path/circuit or welding lines 250 for welding. In this embodiment, one welding line 250 is connected to an exemplary welding torch 260 (comprising an electrode E), which may be any gun or torch of a welding device suitable for any of the exemplary welding processes mentioned above. The welding torch 260 may be attached to an automated movement device, such as a robot. The other welding line 250 is connected to the workpiece W to complete the welding circuit, as is known in the art. As shown in FIG. 1, in one embodiment, the torch 260 is mounted to a robot arm for positioning during welding. Welding system 200 also includes an absolute position sensor 270 for sensing the absolute position of the welding torch 260. The absolute position sensor 270 may be any sensor capable of determining the absolute position of the welding torch 260. In some embodiments, the absolute position sensor 270 is mounted directly to the torch 260. Exemplary absolute position sensors 270 can include accelerometers, gyroscopes, optical systems, RF systems, etc. In some embodiments, the absolute position sensor 270 may comprise a system of sensors, transmitters, receivers, transceivers, etc. It should be understood that the absolute position sensor 270 may utilize a reference or starting point to be able to determine its absolute position. In one embodiment, a reference point may be a fixed point within the cell 10. The absolute position sensor 270 provides data/feedback to the controller 210 indicative of the absolute position of the torch 260.

Welding system 200 also includes a relative position sensor 280 for sensing the relative position of the welding torch 260 to the welding path. The relative position sensor 280 may be any sensor capable of determining the relative position of the welding torch 260 to the actual weld path associated with the workpiece W. In some embodiments, the relative position sensor 280 is a current sensor in the welding circuit path, as discussed in detail below. When sensing current, the relative position sensor 280 may be located anywhere in the output path 250. Exemplary relative position sensors 280 can include current sensors, optical systems, magnetic systems, etc. In some embodiments, the relative position sensor 280 may comprise a system of sensors, transmitters, receivers, transceivers, etc. It should be understood that the relative position sensor 280 may utilize a reference or starting point to be able to determine its relative position. The relative position sensor 280 provides data/feedback to the controller 210 indicative of the relative position of the torch 260 to the actual weld path.

Sensing the position of the welding torch 260 during welding may be used to guide and adjust the welding torch 260 position along a planned welding path (which may be a series of positions). In other embodiments, position information may also be used to simply determine when an actual position of the welding torch 260 is different than a planned position. For example, in one embodiment, the welding system 200 can be configured so that the torch 260 follows a groove in a workpiece W while welding. If the workpiece W is not in the expected or planned position (e.g., due to dimensional variation of the part/workpiece (W), fixturing alignment, etc.), the welding system 200 can automatically follow the groove so that the weld is applied properly even though the actual path is different than the planned path. Position information can include relative and/or absolute data. In one embodiment, as discussed in detail below, sensing the relative position of the welding torch to the actual weld path is one technique for maintaining the torch 260 along the proper weld path. Sensing the absolute position of the torch 260 can be used to quantify any differences between the actual weld path and the planned weld path.

Figure 3:
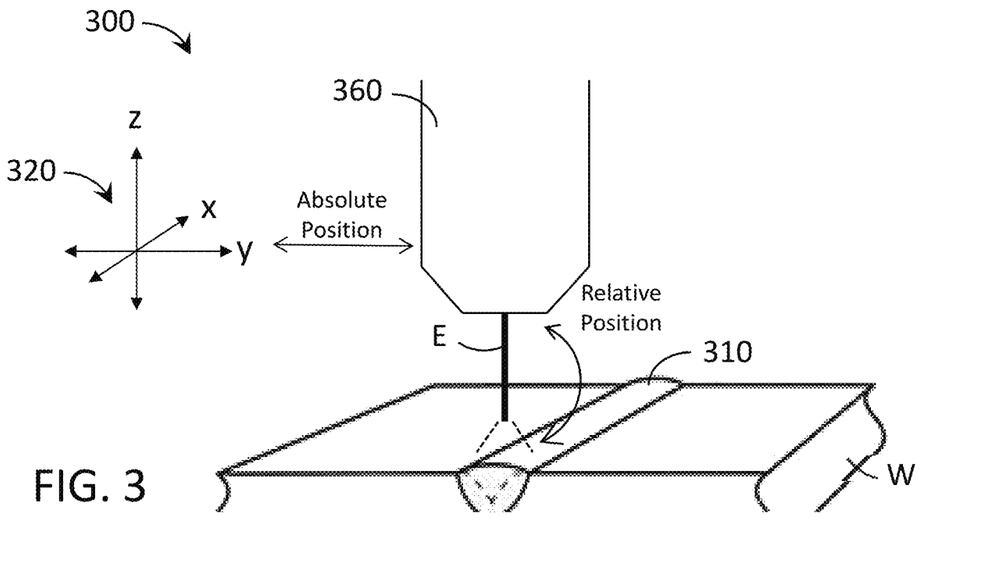
FIG. 3 illustrates an exemplary welding torch shown with an electrode proximate to an actual weld path on a workpiece showing exemplary absolute and relative position relationships.

FIG. 3 is a drawing of another exemplary system 300 with exemplary torch 360. In FIG. 3, torch 360 is shown with an electrode E proximate to actual weld path 310 on workpiece W. In this embodiment, an exemplary reference system 320 is also shown as a three-axis reference with planes in x, y, and z directions. In one embodiment, reference system 320 may utilize a cartesian coordinate system to identify locations with x, y, and z coordinates, as is known in the art. Other reference systems, including angular systems, may also be used. Various reference, starting, or "zeroing" techniques may be used. As depicted in FIG. 3, the relative position of the torch 360 to the weld path 310 (e.g., via relative position sensor 280) may be sensed. At the same time, the absolute position of the torch 360 (e.g., via absolute position sensor 270) may be sensed according to the reference system 320 in x, y, and z coordinates.

For example, with additional reference to FIG. 2, relative position sensor 280 may sense that the actual position of the torch 360 along a weld path is farther right (e.g., +1 in the lateral y direction) and farther down (e.g., −1 in the up/down z direction) than the planned point along the weld path. At the same time, absolute position sensor 270 can sense that the torch 360 is at some exemplary position (4, 2, 3) in the reference system 320 (i.e., the torch 360 is at an absolute position of x=4, y=2, and z=3 along the x, y, z axes). As discussed in more detail below, it is important for the system 300 to be able to determine the absolute position of the torch 360 while determining variations in the relative position.

Figure 4:
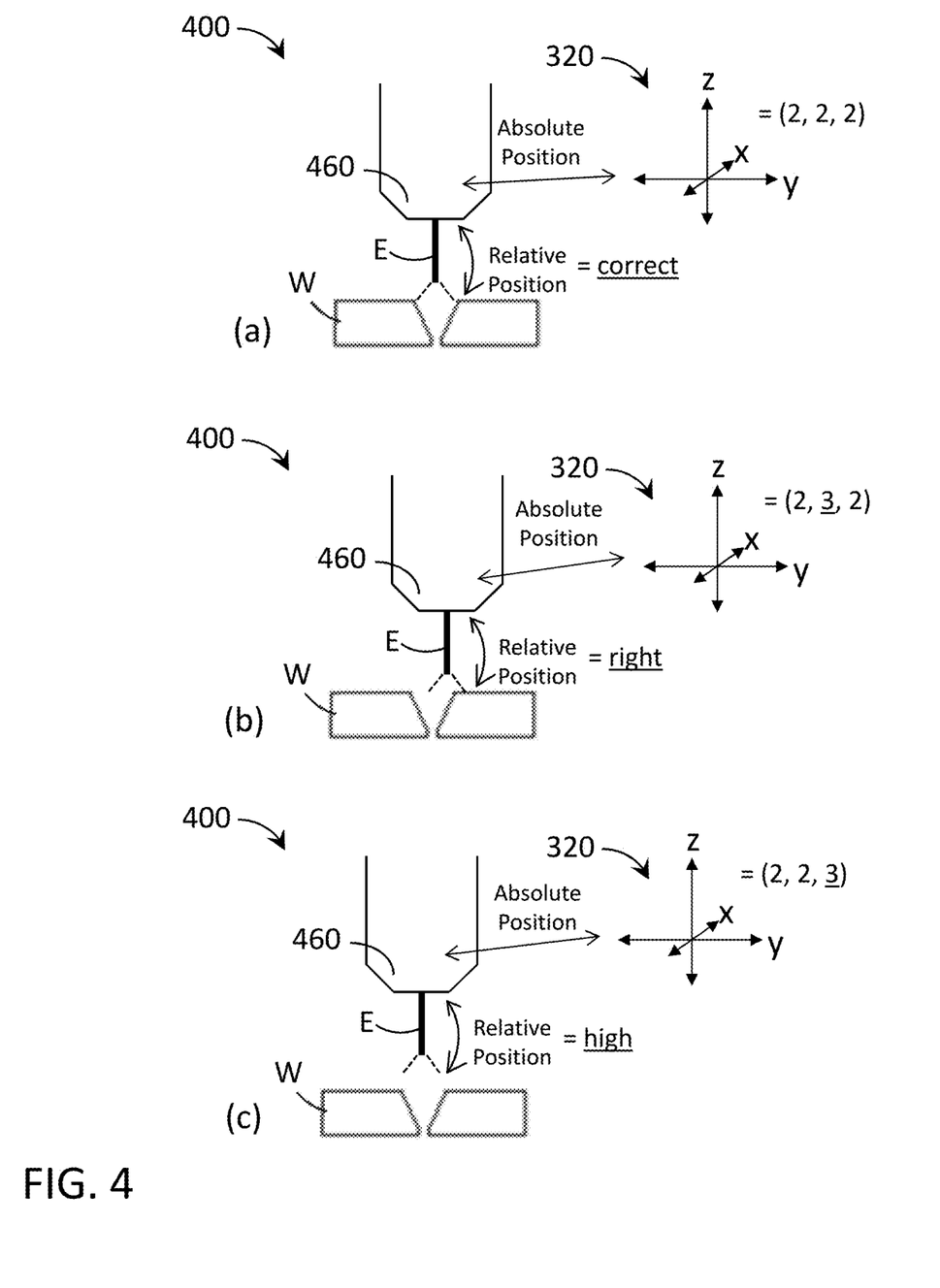
FIG. 4 illustrates an exemplary welding torch at various positions during welding.

FIG. 4 is a drawing 400 of an exemplary welding torch 460 at various positions during welding. Position (a) shows welding torch 460 with electrode E at a correct relative position to the actual weld path on workpiece W (correct lateral position and correct height position). For exemplary purposes, this torch position corresponds to the absolute position (2, 2, 2) using the reference axes 320. Position (b) shows welding torch 460 with electrode E at a relative position to the right (in the lateral direction) of the actual weld path on workpiece W. For exemplary purposes, this torch position corresponds to the absolute position (2, 3, 2) using the reference axes 320. Position (c) shows welding torch 460 with electrode E at a relative position higher than the actual weld path on workpiece W. For exemplary purposes, this torch position corresponds to the absolute position (2, 2, 3) using the reference axes 320.

Welding systems can react to sensed relative position data in various ways. For example, in one embodiment, the welder system can sense that the relative position of the welding torch to an actual weld path is different from the planned weld path while the torch follows the planned path. In another embodiment, the welder system can sense that the relative position of the welding torch to an actual weld path is different from the planned weld path while the torch follows the actual path. In either embodiment, the welder system can adjust the actual position of the torch in response to the difference. These adjustments can happen in real time or be applied to subsequent positions along the weld path and/or subsequent passes along the weld path. Position data can be collected and adjustments can be made during various welding patterns, including straight (stringer), stutter-step, weave, circular, convex, concave, triangle, ladder, "v," square, stepped, etc.

Figure 5:
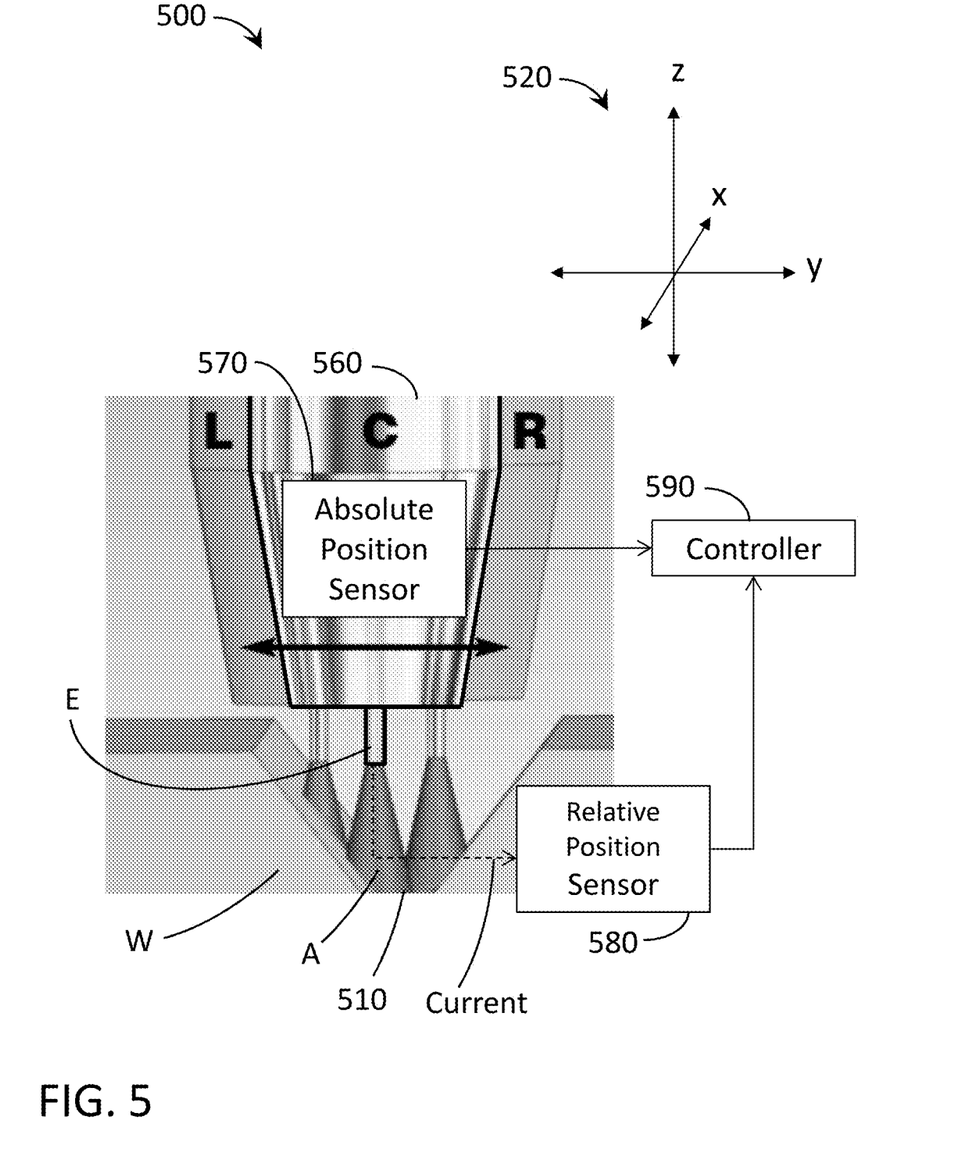
FIG. 5 illustrates another exemplary welding torch shown with an electrode proximate to an actual weld path on a workpiece showing changes in the welding arc due to lateral movement.

In one embodiment, the relative position of the welding torch to an actual weld path can be determined by monitoring the welding current passing through the arc, for example, using Through Arc Seam Tracking (TAST). FIG. 5 is a drawing of another exemplary system 500 with exemplary torch 560. In FIG. 5, torch 560 is shown with an electrode E proximate to actual weld path 510 on workpiece W. FIG. 5 shows a left L, center C, and right R position of the welding torch 560 relative to the weld path 510 as the welding torch moves side-to-side with a lateral weave welding pattern (L→C→R→C→L→C→R . . . ). In this embodiment, an exemplary reference system 520 is also shown as a three-axis reference with planes in x, y, and z directions, as described above.

As depicted in FIG. 5, the relative position of the torch 560 to the weld path 510 is sensed by a relative position sensor 580. In this embodiment, the relative position sensor 580 is a current sensor that senses the current flowing from the electrode E to the workpiece W through the welding arc A. TAST uses welding current feedback to determine the vertical position of the torch 560 along the "z" axis relative to the weld path 510. As the electrode E to workpiece W distance increases, current gets smaller. As the electrode E to workpiece W distance shortens, the amount of current increases. TAST corrects variations in the torch's vertical position to maintain the electrode E height above the workpiece W (e.g., stick-out). Similarly, TAST can use welding current feedback and the weave welding pattern of a robot to determine the lateral position of the torch 560 along the "y" axis relative to the weld path 510. For example, at the center of the weld path 510 groove (e.g., center C position of the torch 560 in FIG. 5), welding arc A current is at a minimum. As the torch 560 reaches the edge of its weave cycle (e.g., left L position of the torch 560 in FIG. 5), welding arc A current peaks. If the value of the peak welding arc A current at one edge of the weave cycle is increasing, the torch 560 is moving away from the actual weld path 510. In this situation, a controller 590 of the welding system 500 can adjust the welding torch 560 towards the center of the actual weld path 510 to maintain a proper weld path in spite of weld path variation.

However, although TAST and similar systems can provide arc, current, and/or positional feedback to determine the relative position of the welding torch 560 to the actual weld path 510, processing (of the feedback signals) and bandwidth constraints can prevent these technologies from reliably maintaining the torch 560 along a weld path centered with the weld joint at typical welding speeds. TAST and similar techniques are reactionary and do not include any absolute positional shifts to the ongoing weld path. For example, if the workpiece W is shifted to the right R, each lateral pass of the weave pattern along the weld path 510 using TAST will result in an early pivot point on the left L side and a late pivot point on the right R side relative to the planned weld path if the welding system 500 is configured to adjust in real time. Constant adjustment of these pivot points is not possible at higher welding speeds, such as, for example, at around 40-50 inches per minute. In some applications, TAST and similar techniques may not be able to make sufficient adjustments even at slower weld speeds, depending on the various aspects of the weld.

To address this issue, the absolute position of the torch 560 to the weld path 510 can be sensed by an absolute position sensor 570 at virtually the same time the relative position of the torch 560 to the weld path 510 is sensed by a relative position sensor 580. In one embodiment, the absolute position of the torch 560 may be sensed according to the reference system 520 shown in FIG. 5 in absolute x, y, and z coordinates. Determining the absolute position of the welding torch 560 from robot head positional data is not effective due to inadequate accuracy, phase relationship problems, and bandwidth/processing limitations with the robotic system at welding speed. Positional data from the robot controller can be inaccurate and may be significantly delayed.

The absolute position data indicates the absolute position of the torch 560 as it is welding and receiving relative position feedback, for example, via the TAST system. In this manner, data collection and processing is not coupled to the robot controller, avoiding its inherent problems as discussed above. Data feedback from the absolute position sensor 570 and the relative position sensor 580 can be provided to the weld controller 590. In this embodiment, the controller 590 can calculate a correction vector based on the relative position of the welding torch 560 to the actual weld path 510 and based on the absolute position of the welding torch 560 when the actual weld path 510 is different than the planned weld path. The correction vector can be used to adjust subsequent points along the planned weld path and/or subsequent passes along the same weld path. In various embodiments, the correction vector can be implemented by adjusting the planned weld path in the welding routine 240 by the correction vector, providing the correction vector to the robot controller, etc. In other embodiments, a portion or all of the correction vector may be applied to other devices that can adjust the relative position of the welding torch to the workpiece, including, for example, a work table positioning device. Application of the correction vector can be implemented quickly and accurately and results in position adjustments that apply to the entire weld path 510, eliminating the need to repeat the adjustment processing for future points needing the same adjustment.

Furthermore, the robot's weld path can be adjusted by the correction vector on an ongoing basis. For example, absolute position data and TAST feedback (via sensors 570 and 580, respectively) can be accumulated for 5-10 weave cycles across the weld path 510. By combining the absolute position data and the TAST relative data, the actual weld path position can be related to the planned weld path position (e.g., in the reference system 520) using a variety of algorithms. For example, the average difference between the actual weld path and the planned weld path over the 5-10 cycles can be used to calculate the correction vector applied to the subsequent weld path controlled by the robot. In another embodiment, absolute and relative position data can be continuously collected and applied to the correction vector, for example, as a 5-10 cycle rolling average.

Figure 6:
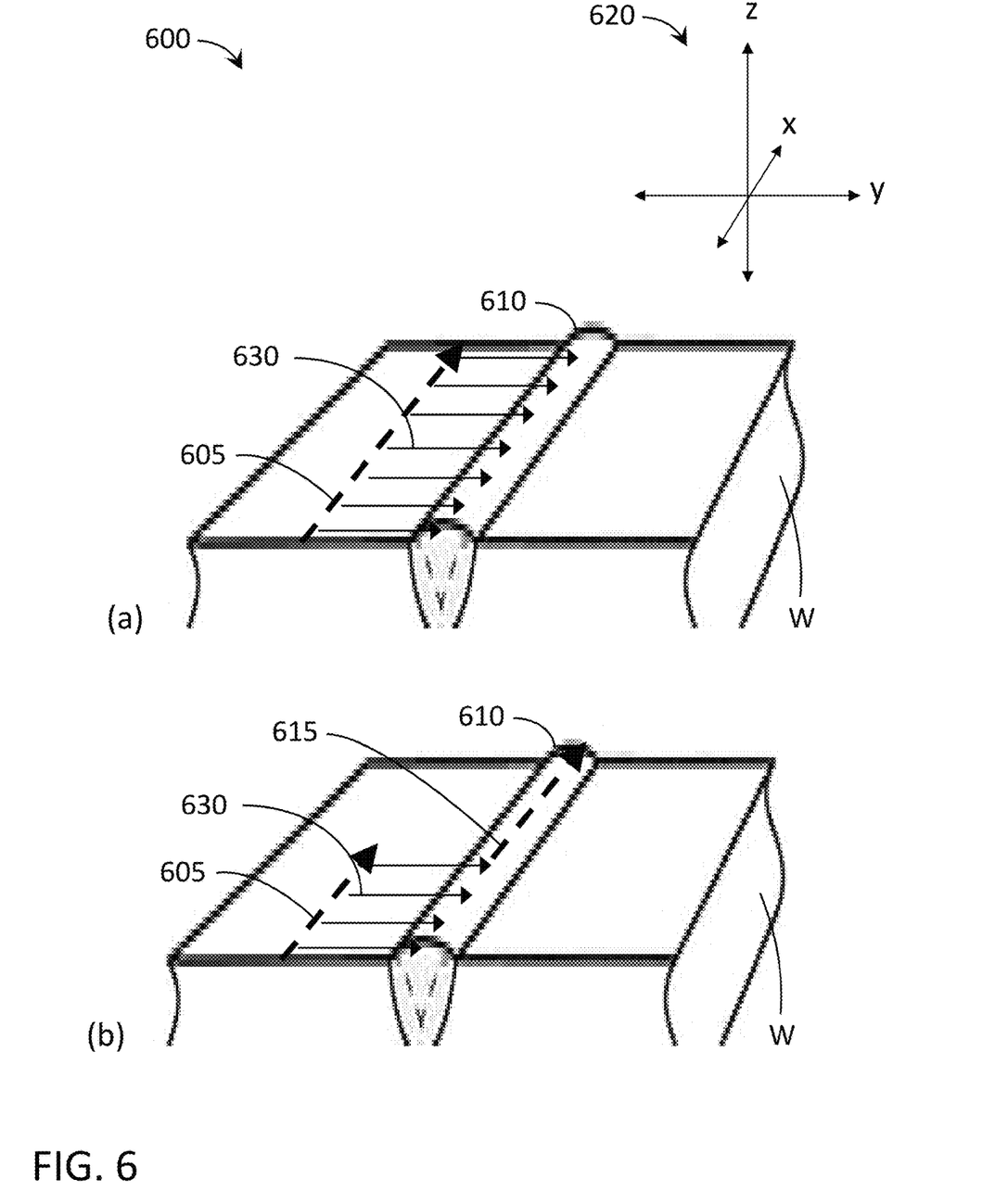
FIG. 6 illustrates an exemplary planned weld path before and after application of an exemplary correction vector.

FIG. 6 is a drawing 600 of an exemplary planned weld path before and after application of an exemplary correction vector, based on a combination of relative and absolute position data. A planned weld path 605 and an actual weld path 610 are shown on workpiece W. Welding pass (a) shows planned welding path 605 and relative position-based corrections 630 to reach the actual welding path 610 for each position or cycle along the welding path. In this example, the corrections to the welding torch (not shown) position are in the +y direction. For example, a TAST system may be employed to sense the relative position of the welding torch to the actual weld path and continually adjust as required for each point. For exemplary purposes, this torch position correction may correspond to a y+3 correction to each point using the reference axes 620.

Welding pass (b) shows planned welding path 605 and relative position-based corrections 630 to reach the actual welding path 610 for the first four cycles along the welding path. However, in this pass, the absolute positions of the welding torch during the first four corrections in the +y direction are captured by an absolute position sensor. A welding controller (not shown) can calculate a correction vector based on the relative position of the welding torch to the actual weld path 610 and the absolute position of the welding torch when the actual weld path 610 is different than the planned weld path 605. In this example, the calculated correction vector would be (0, +3, 0). After the fourth cycle, the correction vector of (0, +3, 0) is applied to the planned welding path 605, resulting in the adjusted path 615 for the subsequent positions. The subsequent cycles associated with adjusted path 615 no longer require the continuous corrections 630 (and associated processing) shown in pass (a).

For example, the weld torch position can be adjusted in real time based on relative position data (e.g., sensed arc current). However, as these relative position adjustments are happening, the actual adjustments are not tracked or quantified. To address this deficiency, in one embodiment, as the torch's position is adjusted to track the actual weld path, the torch's absolute position in a reference system (e.g., x, y, and z coordinates) is compared to the planned position in the same reference system to determine the difference between the planned and the actual weld positions (path). This data represents the adjustments being made in real time to the torch's position. From this data and its differences, a correction vector can be calculated and pre-applied to subsequent positions/paths to eliminate the need for the same adjustment. In this manner, relative position adjustments trigger absolute position checks that drive the correction vector calculation and implementation.

Various combinations of continued/periodic monitoring and various algorithms may be used to calculate a correction vector and when to implement the correction vector. For example, averages, rolling averages, maximums, minimums, offsets, hysteresis, etc., and various control theories may be applied to the correction vector. Furthermore, the individual components of the correction vector (e.g., x, y, and z components in the exemplary reference axes discussed above) may be subject to different algorithms and/or timing. For example, variances in x positions may result in changes to the correction vector in a different manner and at a different time than variances in y and/or z positions. The correction loop (described in detail below) may be executed independently (but concurrently) for x, y, and/or z. Correction vectors may be stored, compared to subsequently calculated correction vectors, various thresholds, etc. before making adjustments/updates to or implementing correction vectors.

The following block diagram is an exemplary methodology associated with calculating and implementing a correction vector, including in accordance with the systems described above. The exemplary methodologies may be carried out in logic, software, hardware, or combinations thereof. In addition, although the methods are presented in an order, the blocks may be performed in different orders, series, and/or parallel. Further, additional steps or fewer steps may be used.

Figure 7:
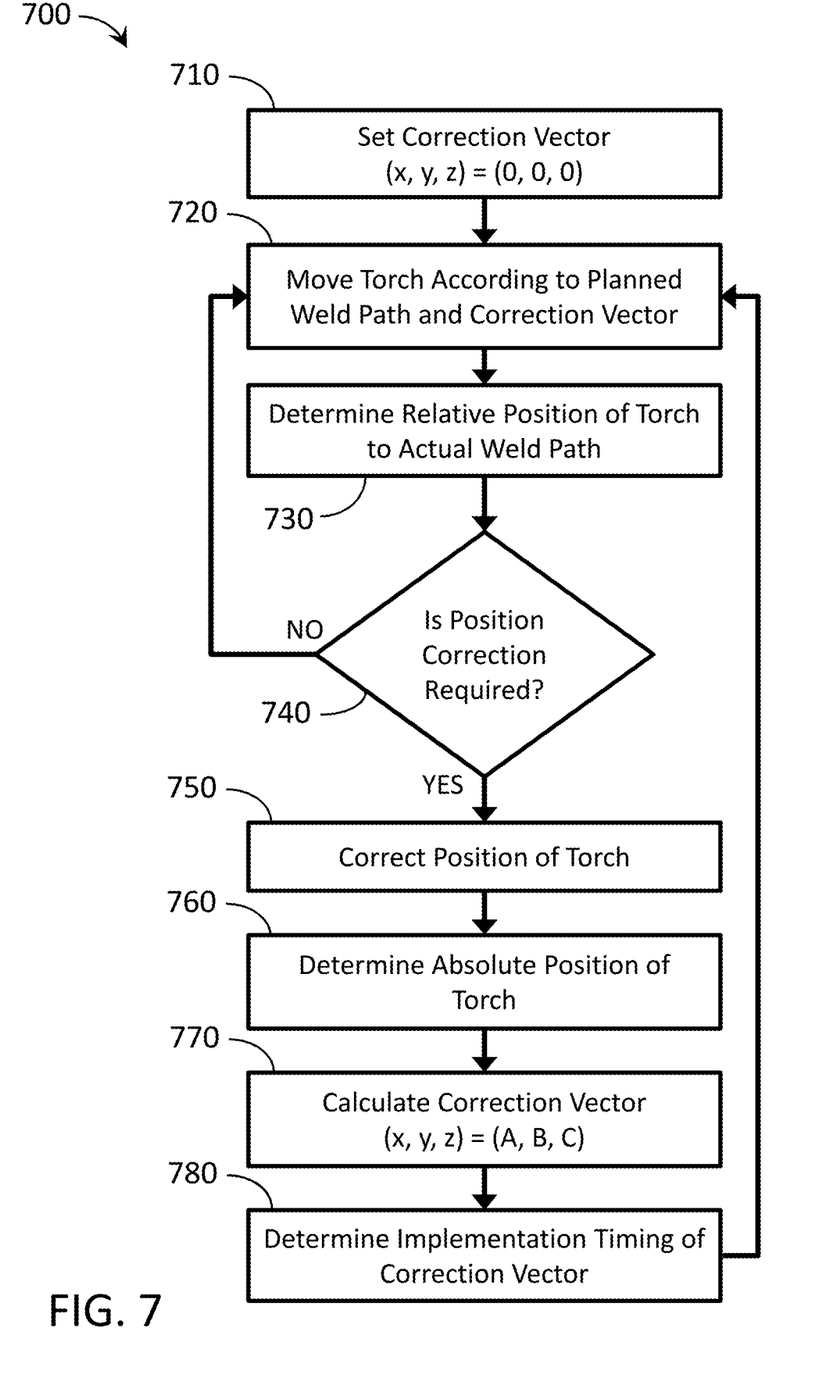
FIG. 7 illustrates a flowchart of an exemplary method of calculating and implementing a correction vector.

FIG. 7 shows an exemplary method 700 of calculating and implementing a correction vector using any of the apparatuses, systems, devices, components, and/or configurations described above. First, at step 710, the method includes setting an initial correction vector to zero. Then, at step 720, the method includes moving the welding torch according to a planned weld path and the correction vector. Next, at step 730, the method includes determining a relative position of the welding torch to an actual weld path. For example, the relative position may be determined using a current sensor, including as part of an automated seam tracking system. At step 740, the method determines whether a position correction is required, based on the relative position data. If a position correction is not required (e.g., when the actual weld path is close enough to the planned weld path or less than a threshold), then the method returns to step 720 for continued movement of the welding torch without an implementation of or adjustment to the correction vector.

If a position correction is required (e.g., when the actual weld path is different than the planned weld path or greater than the threshold), then the method proceeds to step 720, were the position of the welding torch is corrected. At step 760, the method also determines the absolute position of the welding torch that corresponds to the correction of the welding torch from step 750. Determining the absolute position of the welding torch that corresponds to correction of the welding torch's relative position to the actual weld path quantifies the correction in a manner that allows for further analysis and/or processing. At step 770, the method calculates a correction vector based on the relative and absolute position data. Next, at step 780, the method determines when to implement the correction vector.

For example, in one embodiment, if the relative position of the welding torch is corrected by moving +3 in the y direction for 5 consecutive welding cycles, then a correction vector of (0, 3, 0) can be processed to the robot controller to shift the planned robot movement for the welding path +3 in the y direction so that continued adjustments of +3 in the y direction do not need to be processed by the weld controller for each position along the weld path.

While the embodiments discussed herein have been related to the systems and methods discussed above, these embodiments are intended to be exemplary and are not intended to limit the applicability of these embodiments to only those discussions set forth herein. The control systems and methodologies discussed herein may be equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those of skill in the art.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

We claim:

1. A welding system, comprising:
   a welding device comprising a welding torch;
   a relative position sensor for sensing a relative position of the welding torch to an actual weld path in real time during a welding operation;
   an absolute position sensor for sensing an absolute position of the welding torch in real time during the welding operation; and
   a welding controller to aid in controlling movement of the welding torch in real time during the welding operation based on a planned weld path and a correction vector;
   wherein the welding controller comprises logic for calculating the correction vector, in real time during the welding operation, based on the relative position of the welding torch to the actual weld path and the absolute position of the welding torch when the actual weld path is different from the planned weld path.

2. The system of claim 1, further comprising a memory storing the planned welding path.

3. The system of claim 1, wherein the relative position sensor comprises a current sensor.

4. The system of claim 1, wherein the absolute position sensor comprises at least one accelerometer.

5. The system of claim 1, further comprising:
   a robot for moving the welding torch; and
   a robot controller for controlling movement of the robot with aid of the welding controller;
   wherein the robot controller adjusts movement of the robot based on the correction vector.

6. The system of claim 1, wherein the relative position sensor is associated with a weld path tracking system.

7. The system of claim 1, wherein the welding torch moves at least 50 inches per second along the actual weld path.

8. A welding system, comprising:
   means for welding with a welding torch;
   means for moving the welding torch in accordance with a planned welding path and a correction vector in real time during a welding operation;
   means for determining a relative position of the welding torch to an actual weld path and determining an absolute position of the welding torch in real time during the welding operation; and
   means for calculating a correction to the movement of the welding torch based on the relative position of the welding torch to the actual weld path and the absolute position of the welding torch in real time during the welding operation.

* * * * *